(12) United States Patent
Carapelli

(10) Patent No.: US 8,881,046 B2
(45) Date of Patent: *Nov. 4, 2014

(54) VIRTUAL PIN PAD FOR FUEL PAYMENT SYSTEMS

(71) Applicant: Gilbarco, S.R.L., Florence (IT)

(72) Inventor: Giovanni Carapelli, Florence (IT)

(73) Assignee: Gilbarco, S.R.L., Florence (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,684

(22) Filed: Feb. 26, 2013

(65) Prior Publication Data

US 2013/0174080 A1    Jul. 4, 2013

Related U.S. Application Data

(63) Continuation of application No. 12/695,692, filed on Jan. 28, 2010, now Pat. No. 8,392,846.

(51) Int. Cl.
*G06F 3/048* (2013.01)
*G06F 3/0481* (2013.01)
*G06Q 20/20* (2012.01)
*G07F 7/10* (2006.01)

(52) U.S. Cl.
CPC ............ *G06F 3/0481* (2013.01); *G06Q 20/206* (2013.01); *G07F 7/10* (2013.01); *G07F 7/1041* (2013.01)
USPC ........................................................ 715/773

(58) Field of Classification Search
USPC .......................................... 715/863; 713/184
See application file for complete search history.

(56) References Cited

U.S. PATENT DOCUMENTS

| | | | | |
|---|---|---|---|---|
| 4,479,112 A | * | 10/1984 | Hirsch | ............................ 380/52 |
| 5,790,410 A | * | 8/1998 | Warn et al. | ................... 700/232 |
| 5,949,348 A | * | 9/1999 | Kapp et al. | ..................... 340/5.4 |
| 6,209,102 B1 | * | 3/2001 | Hoover | .......................... 726/18 |
| 6,209,104 B1 | | 3/2001 | Jalili | |

(Continued)

FOREIGN PATENT DOCUMENTS

GB    2438886    12/2007

OTHER PUBLICATIONS

PCI POS PED Evaluation FAQ, Sep. 2004, pp. 2-3.*

(Continued)

*Primary Examiner* — Phenuel Salomon
(74) *Attorney, Agent, or Firm* — Nelson Mullins Riley & Scarborough, LLP

(57) ABSTRACT

A method and system for displaying a virtual PIN pad and a virtual non-PIN pad on a touch screen having a screen area. Electronics in electrical communication with the touch screen are operative to provide the virtual PIN pad on the touch screen in a payment mode and provide the virtual non-PIN pad in a non-payment mode. The virtual PIN pad has a first plurality of virtual buttons and the virtual non-PIN pad has a second plurality of virtual buttons, the first plurality of virtual buttons being greater than the second plurality of virtual buttons. The electronics are operative in the payment mode to render the virtual PIN pad having the first plurality of virtual buttons and determine a numerical sequence entered by a user at the virtual PIN pad. The electronics are operative in the non-payment mode to render the virtual non-PIN pad having the second plurality of virtual buttons determine selections entered by a user at the virtual non-PIN pad.

12 Claims, 6 Drawing Sheets

(56) References Cited

U.S. PATENT DOCUMENTS

| | | | |
|---|---|---|---|
| 6,434,702 B1 * | 8/2002 | Maddalozzo et al. | 726/17 |
| 6,442,448 B1 | 8/2002 | Finley et al. | |
| 6,789,733 B2 * | 9/2004 | Terranova et al. | 235/381 |
| 7,484,173 B2 | 1/2009 | Gao et al. | |
| 7,519,653 B1 | 4/2009 | Coutts et al. | |
| 7,953,968 B2 | 5/2011 | Robertson et al. | |
| 8,392,846 B2 | 3/2013 | Carapelli | |
| 2002/0188872 A1 | 12/2002 | Willeby | |
| 2002/0188887 A1 * | 12/2002 | Largman et al. | 714/13 |
| 2003/0040959 A1 | 2/2003 | Fei et al. | |
| 2003/0075600 A1 | 4/2003 | Struthers et al. | |
| 2003/0135751 A1 | 7/2003 | O'Donnell et al. | |
| 2003/0182558 A1 | 9/2003 | Lazzaro et al. | |
| 2005/0143169 A1 * | 6/2005 | Nguyen et al. | 463/25 |
| 2006/0020559 A1 | 1/2006 | Steinmetz | |
| 2006/0037067 A1 | 2/2006 | Morris et al. | |
| 2007/0033398 A1 | 2/2007 | Robertson et al. | |
| 2008/0301575 A1 | 12/2008 | Fermon | |
| 2009/0048710 A1 | 2/2009 | DeLine | |
| 2009/0048945 A1 | 2/2009 | DeLine | |
| 2009/0089869 A1 | 4/2009 | Varghese | |
| 2009/0265638 A1 | 10/2009 | Carapelli et al. | |
| 2011/0199308 A1 | 8/2011 | Nativel et al. | |

OTHER PUBLICATIONS

International Search Report and Written Opinion issued on Mar. 24, 2011 for corresponding Patent Cooperation Treaty International Patent Application No. PCT/EP2010/070432, filed on Dec. 21, 2010.
U.S. Appl. No. 11/197,220 (now U.S. Patent No. 7,953,968), filed Aug. 4, 2005 and portions of the prosecution history regarding same.
Brochure entitled "Crypto VGA", Tokheim Group, Sep. 2008.
Brochure entitled "Ingenico 6550 Pin Pad", Ingenico, Inc., May 2008.
Brochure entitled "Optimum® L 4150", Hypercom Corporation, Dec. 2007.

* cited by examiner

VIRTUAL PIN PAD FOR FUEL PAYMENT SYSTEMS

CROSS-REFERENCE TO A RELATED APPLICATION

This is a continuation of copending application Ser. No. 12/695,692, filed Jan. 28, 2010, which is incorporated fully herein by reference for all purposes.

FIELD OF THE INVENTION

The present invention relates generally to fuel dispenser payment systems. More particularly, the present invention relates to a system and method for providing a virtual PIN pad for a secure payment system, such as those utilized in a fuel dispenser.

BACKGROUND OF THE INVENTION

In recent times, sophisticated payment, point-of-sale, and transaction systems have been integrated into various retail machines that historically did not include relatively advanced electronics. For example, newer fuel dispensers often include graphical displays, audiovisual devices, card readers, keypads or PIN pads, and other input devices. An example of such a fuel dispenser is illustrated in U.S. Pat. No. 7,289,877, which is hereby incorporated in its entirety by reference for all purposes.

Using such a retail terminal, a customer is able to pay for goods or services offered by a retailer by inserting a debit or credit card into the terminal's card reader. The customer may then be required to enter a personal identification number ("PIN") using a PIN pad in order to complete the transaction. The system may also request that the customer provide other information using the PIN pad, which may include sensitive information.

For example, FIG. 1 illustrates a fueling site 100 adapted to provide fuel to a customer and to accept payment for the dispensed fuel. Fueling site 100 comprises a fuel dispenser 102 and a site controller 104. Typically, one or more additional fuel dispensers may also be located at fueling site 100. Fuel dispenser 102 is configured to receive financial information from a customer using a credit or debit card in order to provide payment for the fuel dispensed to the customer's vehicle.

Fuel dispenser 102 typically comprises a user interface 106, a processing device 108, and memory 110. Processing device 108 is operatively connected to user interface 106 and memory 110. User interface 106 includes a display 112, a card reader 114, and a PIN pad 116, each of which is operatively connected to processing device 108. Typically, PIN pad 116 is a physical device comprising a plurality of mechanical buttons or keys.

As should be understood by those skilled in the art, fuel dispenser 102 also includes various components configured to deliver fuel to a vehicle. For instance, fuel dispenser 102 additionally comprises a piping network 118 in fluid communication with one or more underground storage tanks, a meter 120, a pulser 122, a valve 123, a hose 124, and a nozzle 126. Processing device 108 is operatively connected to one or more of these components in order to control their operation and manage the delivery of fuel. Processing device 108 is also operatively connected to site controller 104, which is in communication with a host system 128 via a wide area network ("WAN") 130 (such as the Internet). Site controller 104 is typically situated within a convenience store or central building located within fueling site 100.

Processing device 108 controls the operation of display 112, card reader 114, and PIN pad 116. Display 112 provides visual instructions to the customer as to the manner by which the fueling process should be initiated. For instance, the instructions may direct the customer to swipe a credit or debit card using card reader 114 prior to dispensing fuel. Once this occurs, display 112 may instruct the customer to enter the PIN corresponding to the swiped card via PIN pad 116 (depending on the type of card provided). Display 112 may also be configured to present additional content provided by the convenience store owner or third parties, such as advertisements, during the fueling process.

After the customer enters the PIN, processing device 108 transmits data representative of the payment information provided by the customer including the PIN to site controller 104. Site controller 104 communicates with host system 128 in order to authorize the transaction based on the information provided by the customer. Host system 128 is associated with the entity responsible for the customer's financial account corresponding to the swiped card and either authorizes or denies the transaction. Site controller 104 then informs processing device 108 whether host system 128 authorized the transaction based on the information submitted.

If the transaction has been authorized, processing device 108 allows use of fuel dispenser 102 by the customer. When the fueling process is complete, processing device 108 transmits data to site controller 104 representative of the completed transaction, including the total volume of fuel dispensed and/or the total price of the dispensed fuel. Site controller 104 communicates with host system 128 in order to finalize the transaction, which may include debiting the customer's account for the dispensed fuel, as should be well-known to those in the relevant art.

Physical PIN pads, such as PIN pad 116, are mechanical devices and are therefore susceptible to wear and deterioration. Physical PIN pads also occupy space in the retail terminal and are associated with manufacturing, installation, and maintenance costs, which are substantial in certain instances.

Some payment systems have replaced the conventional display with a touch screen, thereby allowing the customer to provide information to the system via the touch screen. For instance, a payment system may present a "virtual" PIN pad via the touch screen as an alternative to a mechanical PIN pad.

There is concern that virtual PIN pads could be susceptible to fraud. For instance, an unauthorized device may be attached to the touch screen or placed between the touch screen and the processing device in an attempt to intercept a PIN entered by a customer using the touch screen. If the relationships between the virtual keys/numbers and their respective locations on the touch screen are known or can be determined, such a device may attempt to convert the touch screen signals back into the customer's PIN. Or, like a mechanical PIN pad, a perpetrator could observe the customer's finger movement and ascertain the PIN itself.

Moreover, because such touch screens are usually configured to display advertisements in addition to the virtual PIN pad, content intended to deceive a customer into entering a PIN may be provided to the user interface under the guise of being an advertisement. In such a scenario, the touch screen displays the fake advertisement, which may include a false virtual PIN pad, and instructs the customer to enter the PIN. Typically, a touch screen itself is not anti-tampering. In addition, touch screen data is not encrypted if the touch screen is used for general advertisement. For these reasons, touch screen data is usually transmitted "in the clear." Either the uploaded content or an unauthorized device could intercept and transmit the data output by the touch screen to the perpetrator.

Additionally, devices that accept financial information from a customer, such as PINs, must adhere to certain standards to ensure the provided information is secure. For instance, the Payment Card Industry Security Standards Council ("PCI") is an entity that establishes security standards for the protection of sensitive cardholder data. PCI has established the Payment Application Data Security Standard ("PA-DSS") to provide standards for software used in payment systems. Because virtual PIN pads handle sensitive cardholder data, such as PINs, they are subject to the PA-DSS. These devices may also be subject to other standards, such as the EMV standard, originally developed by Europay, MasterCard, and Visa, or those established by other organizations or associations, such as the European Payment Council ("EPC"). Furthermore, because the use of touch screens typically involves the display of both secure and unsecure content by a single device, they may be required to adhere to stricter security requirements than a mechanical PIN pad.

SUMMARY OF THE INVENTION

The present invention recognizes and addresses the foregoing considerations, and others, of prior art construction and methods.

In this regard, one aspect of the invention provides a system for displaying a virtual PIN pad. The system includes a touch screen, a processing device operatively connected to the touch screen, a randomizer configured to generate data representative of various locations on the touch screen, and memory operatively connected to the processing device. The memory comprises program instructions that, when executed by the processing device, cause the touch screen to display a virtual PIN pad at a pad location on the touch screen based on the data generated by the randomizer.

According to another aspect, the present invention also provides a method for presenting a virtual PIN pad on a touch screen. The method includes the steps of maintaining data representative of a grid comprising multiple cells, where the cells correspond to respective detection mechanisms of the touch screen, generating an identifier by a processing device, where the identifier corresponds to a selected cell, and displaying on the touch screen the virtual PIN pad. A button location of the PIN pad corresponds to the selected cell such that the PIN pad will be in a location including the button location.

Yet another aspect of the present invention provides a fuel dispenser configured to facilitate transactions. The fuel dispenser comprises a touch screen having a screen area, where the touch screen comprises a plurality of detection locations and electronics in electrical communication with the touch screen. The electronics are operative to render a virtual PIN pad at varying locations on the touch screen with each successive transaction and determine a numerical sequence entered by a user at the virtual PIN pad.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
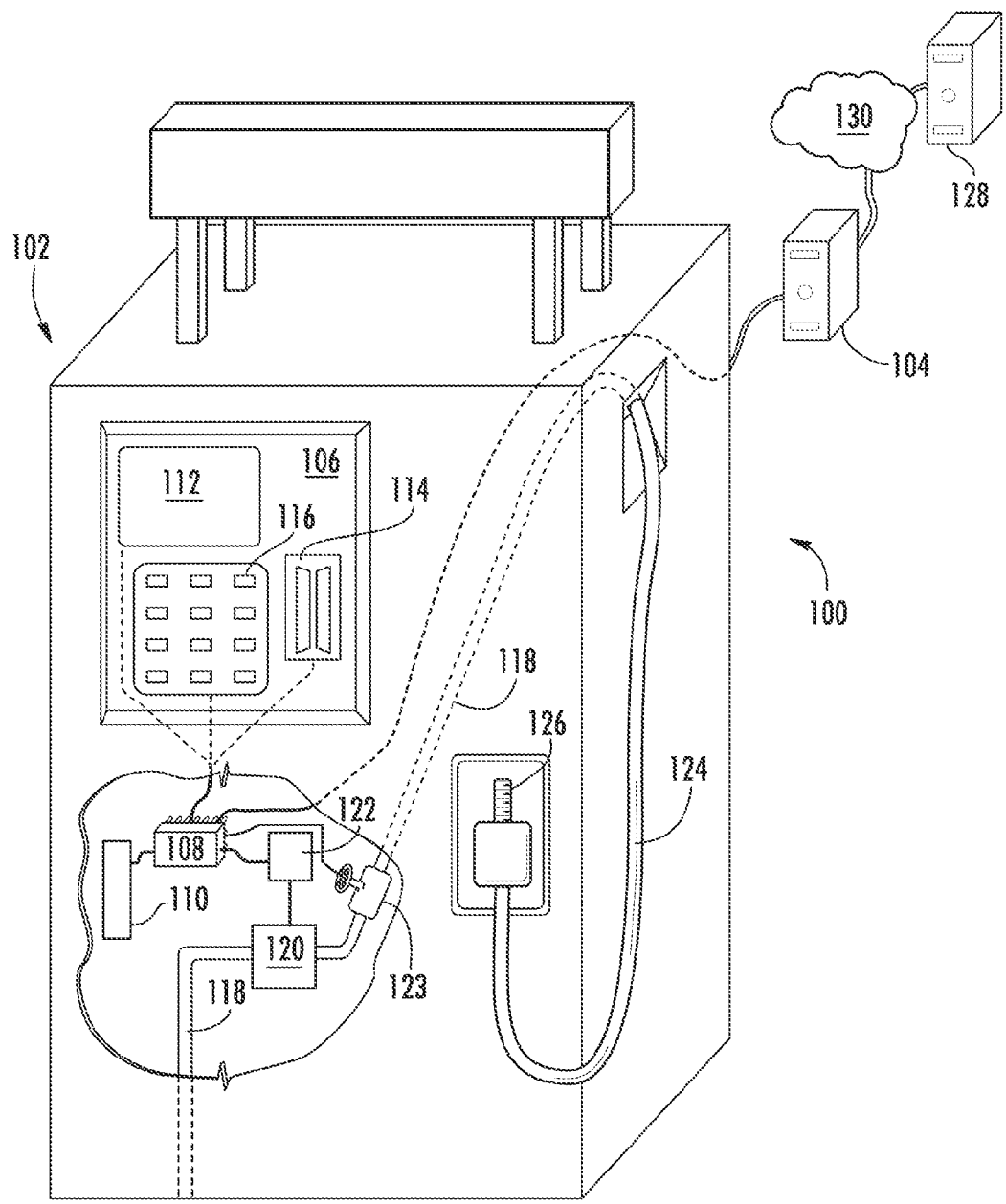
FIG. 1 is a diagrammatic representation of an exemplary fueling site retail system of the prior art.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
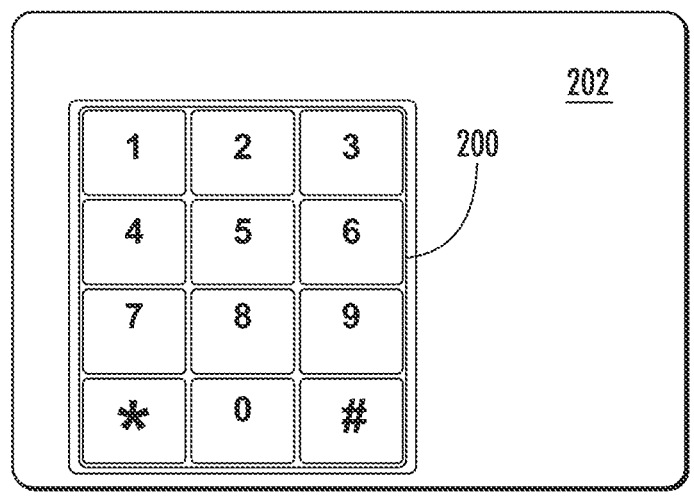
FIG. 2 is a schematic representation of a touch screen including a virtual PIN pad in accordance with an embodiment of the present invention.

FIG. 2 illustrates a virtual PIN pad 200 provided on a touch screen 202. PIN pad 200 is a three-by-four matrix comprising ten numerical keys and two functional keys, such as an asterisk (*) and a pound symbol (#) in this example. Virtual PIN pad 200 is configured to receive a PIN provided by a customer to the PIN pad. Typically, the touch screen interprets the locations on the screen selected by the customer and provides data representative of this information to the dispenser's processing device, as described in more detail below. Because the relationships between the numbers of the virtual PIN pad and their respective locations on the touch screen are known to the processing device, it is able to translate the information received by the touch screen into the numbers selected by the customer.

Use of a virtual PIN pad in lieu of a physical one results in a reduction of space occupied by the user interface since the retail system already includes a display. In such a scenario, the conventional functions of the display, such as displaying instructions and advertisements to the customer, are shown on the touch screen, such as at times when the PIN pad is not displayed. Any installed content relating to payment for fueling transactions, including any virtual PIN pad presented by the installed content, may be referred to as "secure content." Material provided by third parties, such as advertisements, may be referred to as "unsecure content."

Figure 3:
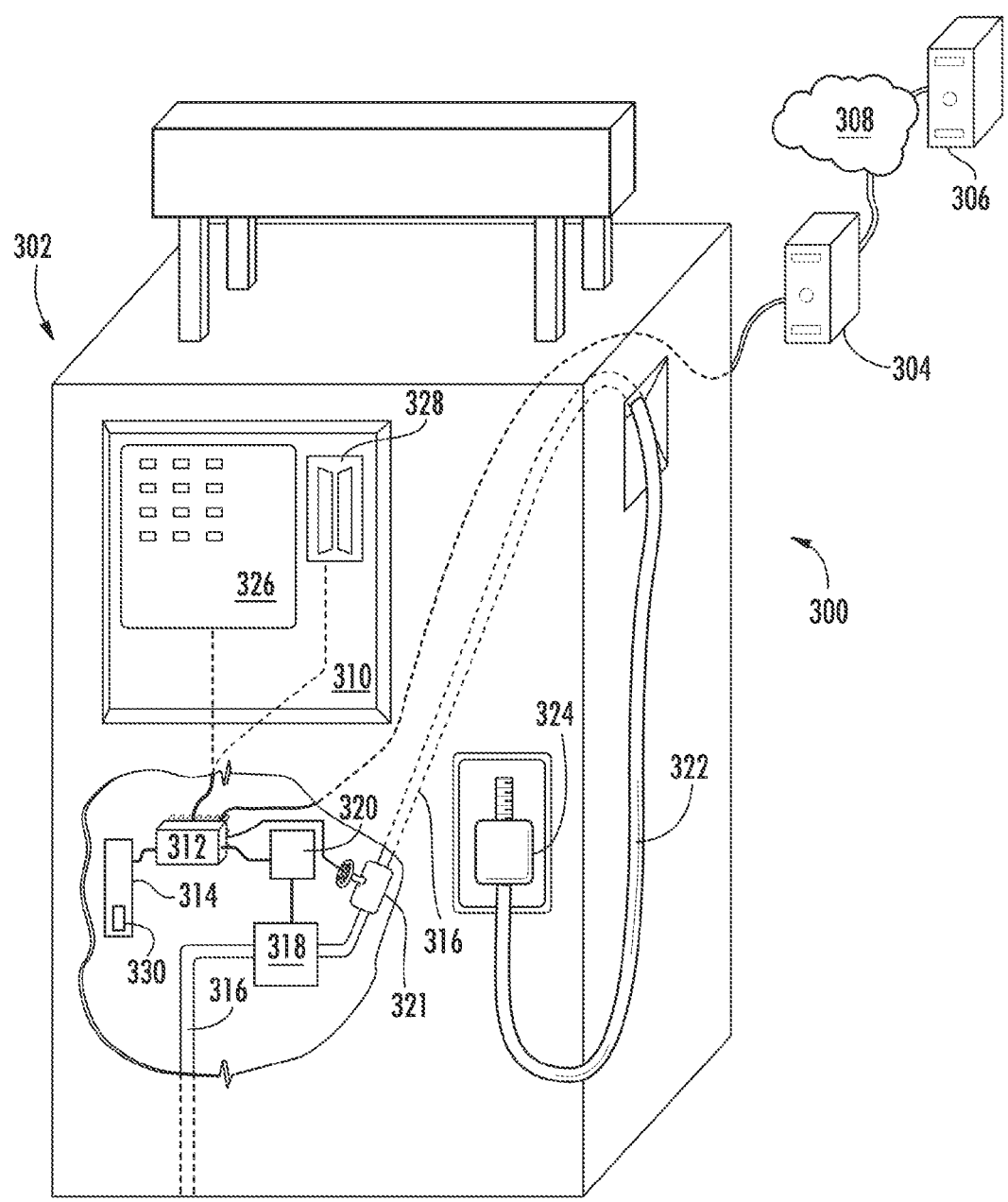
FIG. 3 is a diagrammatic representation of a retail system in accordance with an embodiment of the present invention.

FIG. 3 illustrates a retail system 300 configured for use at a fueling site in accordance with an embodiment of the present invention. In that regard, retail system 300 comprises a retail terminal 302 configured as a fuel dispenser, although it should be understood that various types of retail terminals may be constructed in accordance with the present invention, such as a vending machine that offers for sale admission tickets for concerts, movies, or other events. Thus, while the following description details the operation of retail system 300 and retail terminal 302 in the scenario of a fueling environment, it should be understood by those skilled in the art that embodiments of the present invention may be used in a similar manner in other retail settings.

In the presently-described embodiment, retail system 300 further comprises a site controller 304 operatively connected to fuel dispenser 302. Site controller 304 is in communication with a host system 306 typically via a WAN 308 (such as the Internet). Site controller 304 comprises one or more computers or workstations, such as a point-of-sale ("POS") device and/or a manager's workstation, located in a convenience store or central building within a fueling site. One or more additional fuel dispensers preferably identical to fuel dispenser 302 in configuration and operation may also be included in retail system 300. Retail system 300 may also include additional devices or components configured to securely communicate with host system 306 and fuel dispenser 302. These devices may be located within the convenience store or central building or may be located in or underneath the forecourt. Each of these components comprises a respective processing device and memory and may be connected to WAN 308 and/or to one another via a local area network ("LAN"). Due to the various configurations, locations, and arrangements of these computers, workstations, components, and devices, they are included within the meaning of "site controller" in order to simplify the explanation that follows.

It should also be understood that site controller 304 may be replaced by a processing device located remotely with respect to fuel dispenser 302. For instance, the processing device may be located within a control center operatively connected to the fueling site via WAN 308 and configured to monitor multiple retail terminals and systems. In such an embodiment, processing device 312 of fuel dispenser 302 is operatively connected to WAN 308, which allows the fueling site to operate in an unattended scenario.

In addition to processing device 312, fuel dispenser 302 comprises a user interface 310 and memory 314. Processing device 312 is operatively connected to user interface 310 and memory 314, as shown. Fuel dispenser 302 further comprises components configured to deliver fuel to a vehicle, such as a piping network 316, a meter 318, a pulser 320, a valve 321, a hose 322, and a nozzle 324. Processing device 312 is operatively connected to one or more of these devices in order to control their operation and manage the delivery of fuel. User interface 310 comprises a touch screen 326 and a card reader 328, both of which are operatively connected to processing device 312. It should be further understood that user interface 310 may include additional components, such as a cash acceptor and/or a receipt printer, as necessary or desired.

Processing device 312 may be a processor, microprocessor, controller, microcontroller, or other appropriate circuitry. For example, multiple electronic devices configured to operate together within fuel dispenser 302 may be considered a "processing device." Memory 314 may be any type of memory or computer-readable medium as long as it is capable of being accessed by processing device 312, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Processing device 312 may also include a portion of memory accessible only to the processing device, commonly referred to as "cache." Thus, memory 314 may be part of processing device 312, may be separate, or may be split between processing device 312 and a separate memory device.

Memory 314 comprises computer-executable program code or instructions that when executed by processing device 312 perform one or more steps of the processes described in more detail below with respect to FIGS. 6 through 10. Memory 314 may also comprise one or more data structures for storing information. The computer-executable program code or instructions in this scenario, as should be known to those skilled in the art, usually include one or more application programs, other program modules, program data, firmware, and/or an operating system. In an exemplary embodiment, memory 314 stores a secure algorithm 330 and a random number generator or other suitable randomizer as described in more detail below.

Figure 4:
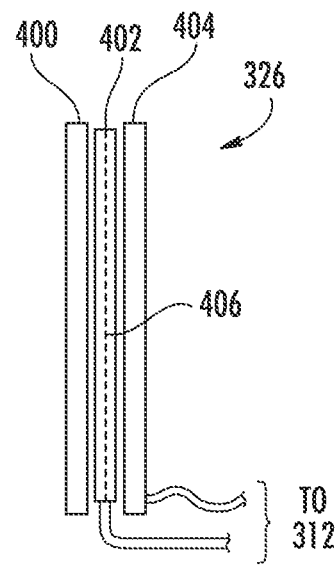
FIG. 4 is a diagrammatic representation of a touch screen of the retail system of FIG. 3 viewed from the side.
Figure 5:
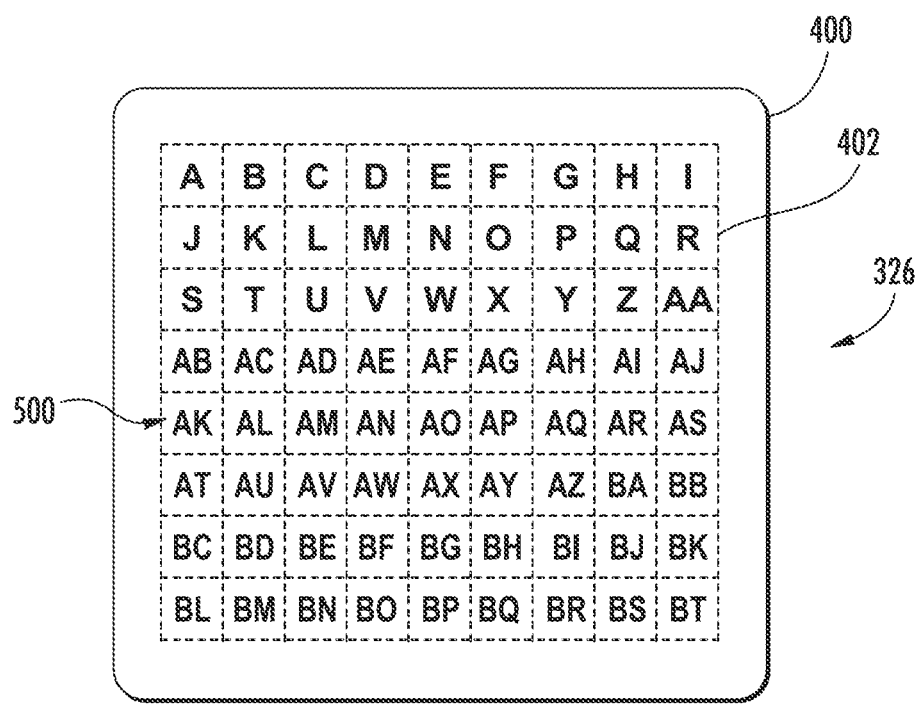
FIG. 5 is a diagrammatic representation of the touch screen of the retail system of FIG. 3 viewed from the front and showing multiple cell positions.

FIGS. 4 and 5 are respective side and front diagrammatic representations of touch screen 326 in accordance with an embodiment of the present invention. Referring to FIG. 4, touch screen 326 comprises a protective glass layer 400, a detection layer 402, and a graphical display 404. Detection layer 402 comprises a plurality of detection mechanisms (denoted by hashed line 406) adapted to detect selection of a location on touch screen 326 by a customer. Detection layer 402 and graphical display 404 are operatively connected to processing device 312. Graphical display 404 may be any suitable device capable of displaying information, such as a liquid crystal display ("LCD").

In the present embodiment, touch screen 326 employs capacitive touch technology such that detection layer 402 is a capacitive touch layer. In such an embodiment, detection mechanisms 406 of capacitive touch layer 402 are a plurality of electrodes. Each electrode is configured to collect a charge generated by, for example, a customer touching a dielectric surface adjacent to the electrodes, such as protective glass layer 400. Capacitive touch layer 402 may be any suitable charge-transfer device that is known in the art, such as those manufactured by Quantum Research Group headquartered in Hampshire, United Kingdom.

FIG. 5 illustrates capacitive touch layer 402 as a grid 500 comprising a number of cells (or blocks) labeled "A" through "BT." Each cell of grid 500 corresponds to an electrode of capacitive touch layer 402 over which the cell is positioned. For instance, cell A corresponds to a particular electrode of capacitive touch layer 402, while cell Z corresponds to another electrode of the layer. Although FIG. 5 illustrates capacitive touch layer 402 sectioned into a grid comprising cells A through BT, it should be understood by those skilled in the art that the grid for any capacitive touch screen is defined by the number, shape, and size of the touch screen and, specifically, by the number and arrangement of the electrodes in the capacitive touch layer. For instance, the grid corresponding to a capacitive touch layer of a touch screen comprising 100 electrodes in a ten-column, ten-row configuration would likewise exhibit ten columns and ten rows of cells so that each cell corresponds to a specific electrode. It should be further understood from the above description that, regardless of the size or configuration, a capacitive touch screen may be sectioned into a grid comprising a known finite number of cells, each of which corresponds to an electrode.

In the presently-described embodiment, memory 314 (FIG. 3) includes a data structure that stores the association of each electrode with the respective cell of grid 500. As should be understood by those skilled in the art, the data structure may also store a unique identification for each association such as a unique numerical ID or other identifier. For example, cell A, which is associated with the first electrode, may correspond to the numerical ID "1," while cell "BT," which is associated with the last electrode, may correspond to the numerical ID "72." It should be further understood that any suitable technique for associating each cell and electrode with a unique key or identifier may be used.

Referring again to FIGS. 4 and 5, a customer touches protective glass layer 400, thereby generating a capacitive charge. As explained above, the customer's touch physically corresponds to a cell of grid 500 that is associated with a specific electrode. That is, the electrode located beneath the specific cell of the grid selected by the customer detects the touch. Capacitive touch layer 402 generates a signal indicating which electrode sensed the charge from the touch and provides the signal to processing device 312. Using the data structure stored in memory 314 (FIG. 3), processing device 312 interprets the signal transmitted by capacitive touch layer 402 to determine the location of touch screen 312 that was selected by the customer. Processing device 312 is configured to determine the user's selection because the associations between the locations on the touch screen selected by the user and the content presented to the user corresponding to the selections are stored within memory 314 and accessible by the processing device. Thus, by comparing the content presented to the user and the locations of the touch screen selected by the user, processing device determines the information provided by the user.

Figure 6:
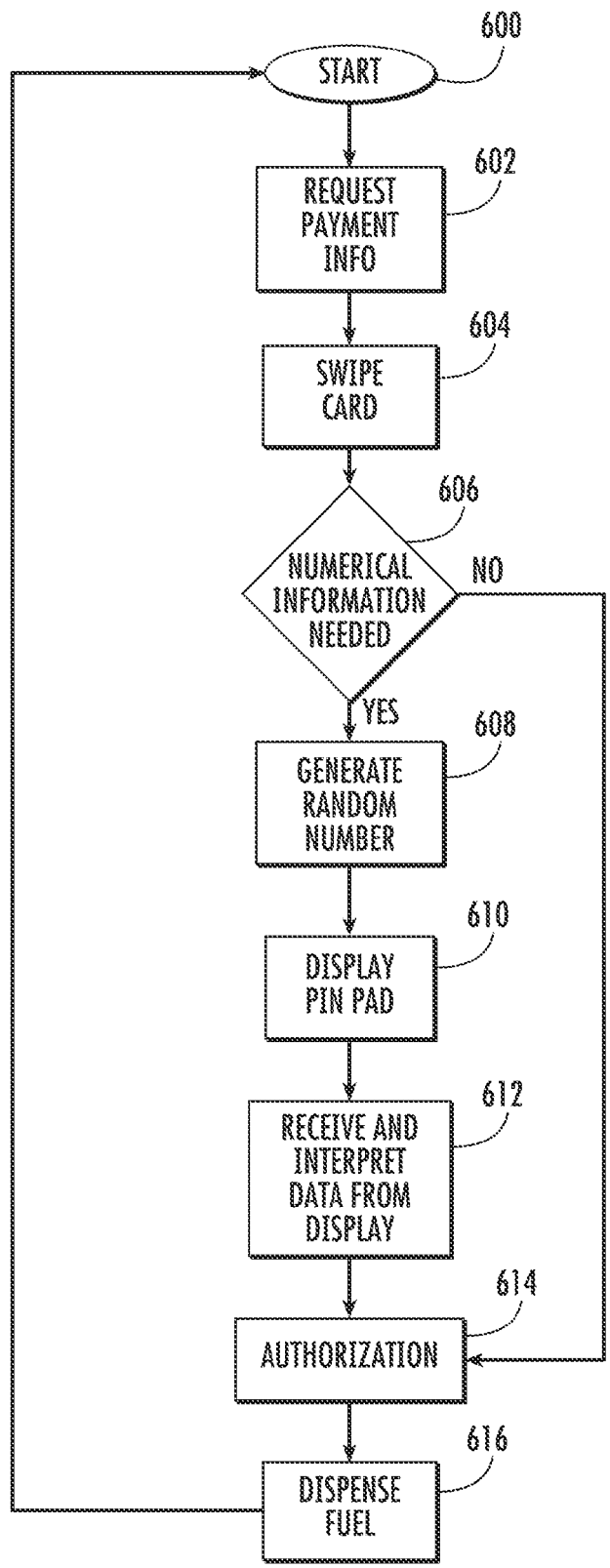
FIG. 6 is a flowchart representing an exemplary process for completing a retail transaction in accordance with an embodiment of the present invention.

The following example of the fueling process is described with reference to FIGS. 3 through 6. In this regard, FIG. 6 is a flowchart representing an exemplary method performed by fuel dispenser 302 pursuant to secure algorithm 330. At step 600, the process begins after a customer positions a vehicle to receive fuel adjacent to fuel dispenser 302. At step 602, processing device 312 directs touch screen 326 to display instructions requesting that the customer provide financial information to fuel dispenser 302 for payment of the fuel prior to dispensing. For instance, the instructions may direct the customer to swipe a card bearing a magnetic strip, such as a debit or credit card, through card reader 328. At step 604, processing device 312 receives information produced when the customer swipes a debit or credit card through the reader. In particular, card reader 328 transmits the financial information received from the card to processing device 312.

At step 606, processing device 312 determines whether a virtual PIN pad should be presented to the customer based on the financial information received by card reader 328 from the customer. For instance, processing device 312 determines whether the customer's PIN or billing zip code is required in order to authorize the transaction. As one skilled in the art will understand, the information necessary to complete a financial transaction may be established by the host system associated with the swiped card or by a regulatory entity, such as PCI. If touch screen 326 does not need to present a virtual PIN pad to the customer, process flow proceeds to step 614 where system 300 attempts to authorize the transactions as described below.

In this example, however, it is assumed that retail system 300 requires the customer's PIN in order to authorize the fueling transaction. If so, process flow proceeds to step 608, where, in this embodiment, the random number generator stored in memory 314 generates a number or identifier corresponding to a cell of grid 400 that allows a PIN pad to be displayed. For instance, the top, left key of a virtual PIN pad having three columns and four rows may only be placed in the rectangular area delimited by cell A through cell AQ. As a result, the virtual PIN pad on touch screen 326 will be positioned so that each key of the PIN pad corresponds to a block of grid 500 and, thus, to an electrode. It should be understood that, in an embodiment where the virtual PIN pad is positioned based on the cell corresponding to the top, left key of the PIN pad, such as in the presently-described embodiment, other cells are also excluded from the selection process. For instance, the cells labeled H, I, Q, R, Z, AA, AI, and AJ would not allow an entire virtual PIN pad to be displayed on the touch screen should one of those cells be selected to correspond to the top, left key of the virtual PIN pad.

Figure 7:
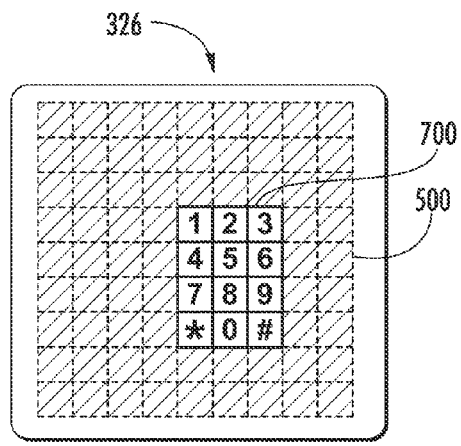
FIGS. 7 through 10 are diagrammatic representations illustrating rendering of virtual PIN pads at various locations on the touch screen in accordance with an embodiment of the present invention.

Since cell AQ is associated with the unique numerical ID 43, the random number generator is configured to generate a random number between 1 and 43, in this embodiment. Certain numbers corresponding to excluded cells, such as 8 (which corresponds to cell "H"), are also excluded from the number selection process. At step 610, processing device 312 directs touch screen 326 to display a virtual PIN pad based on the random number. Referring to FIG. 7, for instance, if the random number generator generates the number 23, which corresponds to cell W, processing device 312 directs touch screen 326 to display virtual PIN pad 700 in the location illustrated. That is, the top, left "button" of virtual PIN pad 700 occupies cell W. While it is preferable that the randomizer or number generator be configured to generate random identifiers corresponding to various locations on the touch screen, it should be understood that it may instead generate identifiers that correspond to various locations on the touch screen in a predefined manner.

Preferably, processing device 312 further directs touch screen 326 to disable all of the electrodes corresponding to cells of grid 500 that do not correspond to any button of PIN pad 700. That is, in this example, touch screen 326 disables all electrodes corresponding to any cell other than those over which PIN pad 700 has been rendered. This is indicated by the area outside of PIN pad 700 that is shaded for purposes of illustration. Thus, should the customer select portions of touch screen 326 located outside the bounds of PIN pad 700, the disabled electrodes do not detect the selection. Touch screen 326, therefore, does not transmit data to processing device 312 representative of selections made by the customer corresponding to cells located outside the area occupied by PIN pad 700. Alternatively, the electrodes corresponding to the shaded area are not disabled, but, rather, touch screen 326 either ignores the detection of touches by those electrodes or does not transmit data representative of the detections to processing device 312.

Referring again to FIG. 6, the customer uses the PIN pad (e.g., PIN pad 700 of FIG. 7) to provide user interface 310 with the appropriate PIN. At step 612, processing device 312 receives data transmitted by touch screen 326 representative of the customer's selections and interprets those selections. That is, because each key of virtual PIN pad 700 corresponds to a cell of grid 500, processing device 312 is configured to translate the customer's touches into the keys that were selected and the sequence of selection. As a result, processing device 312 determines the PIN entered by the customer using PIN pad 700. Because touch screen 326 previously disabled electrodes that do not correspond to any keys of the virtual PIN pad, the data transmitted to processing device 312 does not include data representative of selections made by the customer outside of the area occupied by the PIN pad. Any selections outside of this area may include accidental selections by the customer or responses to a false prompt, as explained in more detail below.

At step 614, processing device 312 encrypts the financial information received from touch screen 326 at step 612 and/or from card reader 328 at step 604 and transmits it to site controller 304. The site controller transmits the information to host system 306 via WAN 308 in order to authorize the transaction. Host system 306 transmits data to site controller 304 indicating whether the host system authorized or denied the transaction, which the site controller relays to processing device 312. If the transaction was authorized, processing device 312 permits use of the fueling components of fuel dispenser 302 (as indicated at step 616). The customer then uses fuel dispenser 302 to dispense fuel to the customer's vehicle.

Upon completion of the process, processing device 312 transmits to site controller 304 data representative that the customer has completed the fueling process, as well as other information, such as the total amount of fuel dispensed. Based on this information, site controller 304 determines the total amount of the transaction and requests host system 306 to finalize the transaction for that amount. Host system 306 completes the transaction, which may include debiting the customer's account corresponding to the card swiped at step 604 for the total amount of the transaction as should be known to those of ordinary skill in the art. Processing device 312 may then perform additional tasks if necessary, such as printing a receipt for the customer. After step 616, process flow returns to step 600 where the system awaits the next customer or transaction.

Figure 8:
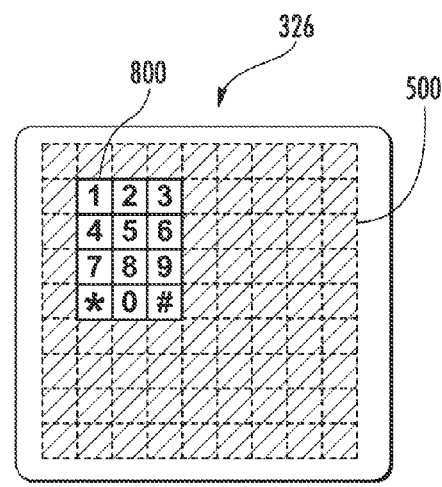

When a subsequent customer arrives at fuel dispenser 302, process flow proceeds to step 606 in a manner similar to that described above. At step 606, processing device 312 again determines whether numerical information, such as a PIN, is required from the customer. If so, process flow proceeds to step 608 where the random number generator stored within memory 314 generates another random number between 1 and 43, in this example. At step 610, processing device 312 directs touch screen 326 to display a virtual PIN pad based on the generated number. Referring to FIGS. 5 and 8, for instance, if the random number generator generates the number 11, which corresponds to cell K of grid 500, processing device 312 directs touch screen 326 to display PIN pad 800 such that its top, left button occupies cell K. Additionally, processing device 312 directs touch screen 326 to disable the electrodes that correspond to the cells that are not occupied by a button of PIN pad 800, as indicated by the shaded area shown in FIG. 8. Accordingly, any selection or touches by the customer of electrodes corresponding to the shaded area are not detected, are ignored, or are not transmitted to processing device 312.

Figure 9:
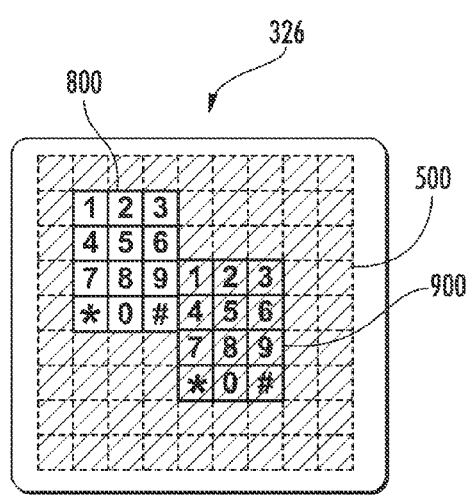

In another embodiment, the random number generator stored in memory 318 and executed by processing device 312 removes the generated number from the list of available numbers after each virtual PIN pad is rendered on the touch screen. That is, in the example provided above, after randomly generating the number 23, it is removed from the list of numbers available for generation. In this embodiment, if the random number generator generates an unavailable number, it continues to generate numbers until it produces an available number. Once all the numbers have been used, the full list of numbers is restored so that all potential numbers are again available for selection. Alternatively, only a certain number of past randomly generated numbers may be removed from the list of available numbers. For instance, only the last five randomly generated numbers may be unavailable for selection in such an embodiment. The specific quantity of the last numbers that are unavailable for selection may be predefined or established by the system operator. Thus, as shown in FIG. 9, each virtual PIN pad is positioned at a location on the touch screen different than the position occupied by the preceding virtual PIN pad(s) rendered by the touch screen.

Figure 10:
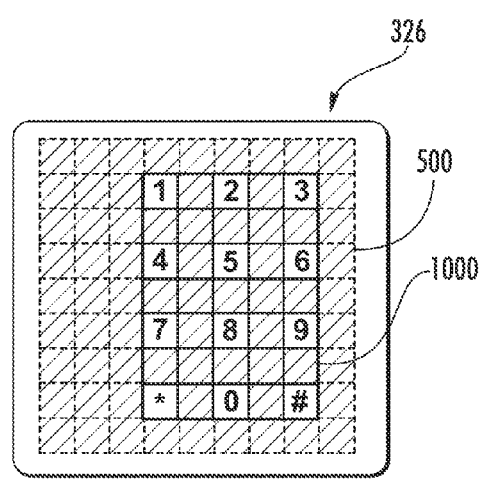

In another embodiment, processing device 312 (FIG. 3) varies the configuration of the virtual PIN pad itself. Referring to FIG. 10, for example, the processing device instructs touch screen 326 to present a virtual PIN pad 1000, where the PIN pad's buttons are not located in cells adjacent one another in the manner described above with respect to FIGS. 7, 8, and 9. In this embodiment, adjacent buttons are separated by "unused" cells. That is, the electrodes corresponding to the cells located in-between the buttons of PIN pad 1000 are deactivated. Alternatively, any signal transmitted by one of the unused cells should the cell be selected is ignored by either touch screen 326 or processing device 312. As a result, touch screen 326 may present a virtual PIN pad having a non-uniform appearance, such as PIN pad 1000, thereby increasing the difficulty of any unauthorized individual from intercepting sensitive information provided by a customer using the touch screen.

It should be understood that processing device 312 may be configured to instruct touch screen 326 to display a virtual PIN pad exhibiting various configurations. For example, touch screen 326 may present a virtual PIN pad having varying amounts of unused cells located in-between the PIN pad's buttons. In one embodiment, the number of unused cells located in-between the buttons of the virtual PIN pad may be selected randomly in a manner similar to that described above regarding the selection of the PIN pad's location. (It should be understood that the number of intervening unused cells may be limited to allow touch screen 326 to be able to display the PIN pad. For instance, the maximum number of intervening unused cells between each button may be limited to two.) In another embodiment, the processing device may instruct touch screen 326 to vary both the location of the virtual PIN pad and the number of intervening unused spaces in a random manner.

In another embodiment, processing device 312 may be configured to instruct touch screen 326 to display each button of the virtual PIN pad at various and/or random locations on the touch screen. Referring to FIG. 5, for instance, the processing device may instruct touch screen 326 to display button "1" at cell "K," button "2" at cell "X," and the other buttons of the virtual PIN pad at respective various locations. This may be accomplished through the use of the random number generator stored in memory 314. In such an embodiment, the processing device instructs touch screen 326 to display each button in a cell corresponding to a respective number generated by the random number generator. The number corresponding to the cell is then removed from the list of numbers selectable by the random number generator. This process continues until touch screen 326 displays all the buttons of the virtual PIN pad. Process flow otherwise proceeds in the manner described above.

Referring again to FIG. 6, for example, when another virtual PIN pad is required, process flow returns to step 600 and proceeds to step 608 as described above. At step 608, the processing device generates a random number, instructs touch screen 326 (FIG. 5) to display a button based on the number generated, removes the number from the list of available numbers, generates another number, and continues until the touch screen displays all the buttons of the virtual PIN pad. Process flow then proceeds in the manner described above.

Those skilled in the art should understand that the above description provides a system and method for displaying a virtual PIN pad at varying and/or random locations on a touch screen incorporated into a retail system. As a result, an unauthorized device connected to the touch screen and intended to intercept transmissions by the touch screen is unable to translate the transmissions into the information entered by the customer. This is because each virtual PIN pad generated is positioned on the touch screen at varying and/or random locations that differ from those occupied by the preceding virtual PIN pads. Thus, a fraud perpetrator cannot determine which electrode of the touch screen will correspond to a specific key of a virtual PIN pad. Each time a PIN pad is required, the retail terminal's processing device varyingly and/or randomly selects the location to display the virtual PIN pad on the touch screen. Thus, only the processing device is able to identify which keys of the virtual PIN pad have been selected by the customer because only the processing device has access to the memory that stores the relationships between the locations on the touch screen and the keys of each virtual PIN pad. As a result, the system and method described above are believed to meet applicable security requirements.

Moreover, electrodes that do not correspond with the area occupied by each virtual PIN pad are preferably either disabled or ignored, as explained above. In the event that a third party uploads an advertisement or other material that displays a fake PIN pad in an attempt to deceive the customer into entering the PIN, the third party either does not receive a response or receives a response that cannot be interpreted by the third party. The processing device instructs the touch screen to disable or ignore selections by the customer of portions of the touch screen located outside the area over which the touch screen displays a virtual PIN pad. Referring to FIGS. 3 and 9, for instance, false PIN pad 900 represents a false prompt displayed as the result of content uploaded by a third party seeking to intercept a customer's PIN. As denoted by the shaded blocks of grid 500 (and as explained above), processing device 312 previously instructed touch screen 326 to disable all electrodes other than those corresponding to authorized PIN pad 800. That is, the electrodes corresponding to the shaded area are disabled. Should the customer attempt to enter a PIN using fake virtual PIN pad 900, the touch screen either does not receive the customer's selections or ignores them.

It should be understood by those of ordinary skill in the art that any data received by an unauthorized device would be unusable. Referring to FIGS. 3 and 5, for example, touch screen 326 transmits data representative of which electrode was selected by the customer to processing device 312. Processing device 312 is able to reconstruct the information provided by the customer using the information stored in memory 314. Processing device 312 and memory 314 are located within an anti-tampering enclosure.

In one embodiment, processing device 312 instructs touch screen 326 to disable the screen's detection mechanisms when displaying unsecure content. Referring to FIG. 5, for instance, in the event that touch screen 326 is configured to display advertisements from third parties or other unsecure content, processing device 312 disables all the cells (A through BT) or instructs touch screen 326 to ignore any signal transmitted by any of the detection mechanisms. It should be understood that the determination of whether content to be presented by touch screen 326 is either secure or unsecure is made by processing device 312, which is located in the anti-tampering enclosure. Thus, unsecure content is unable to switch touch screen 326 into a secure mode when displaying unsecure content.

In another embodiment, processing device 312 instructs touch screen 326 to disable or ignore the screen's detection mechanisms other than those in certain areas of the touch screen. For instance, processing device 312 may allow advertisements to utilize the detection mechanisms in certain predefined areas of touch screen 326, such as the right two columns or the bottom two rows of grid 500. In such an embodiment, processing device 312 limits the number of usable detection mechanisms to less than that required to present an entire PIN pad. For example, processing device 312 may authorize cells BA, BB, BJ, BK, BS, and BT to be used by content provided by third parties. In this example, only six detection mechanisms are activated, such that touch screen 326 will transmit signals from only these six mechanisms to processing device 312. Accordingly, any fake virtual PIN pad displayed by unsecure content will be unable to transmit data representative of an entire PIN pad. Those of ordinary skill in the art should understand that, while at least ten digits are typically required to present a full PIN pad, processing device 312 may limit the number of useable detection mechanisms to any number, such as 9, 8, 7, etc.

In another embodiment, processing device 312 authorizes use by unsecure content by ten or more of the detection mechanisms but limits the data transmitted by touch screen 326 when these detection mechanisms are selected. Referring again to FIG. 5, for instance, processing device 312 may authorize use of the three right columns of grid 500 (those beginning with cells G, H, and I). Processing device 312 groups certain cells within the predefined area together and instructs touch screen 326 to transmit one signal to the processing device for each group. For example, processing device 312 may predefine cells G, H, I, P, Q, R, Y, Z, and AA as one group, area, or button. When any of the cells in the group is selected, touch screen 326 transmits data to processing device 312 indicating that one detection mechanism in the group has been selected but not identifying the particular mechanism. In this example, the unsecure content is authorized to use four large areas of touch screen 326 as buttons. However, the unsecure content is only able to receive data from the customer corresponding to the four selections and is therefore unable to receive signals corresponding to an entire PIN pad even if one should be displayed. In such an embodiment, the unsecure content is able to elicit a "yes or no" answer from a customer or a selection of four categories. For example, the content may ask a customer if the customer is interested in nearby accommodations, dining, entertainment, or attractions, but is unable to request and receive the customer's PIN.

It should be further understood that the processing device possesses the ability to determine or translate the information provided to the touch screen. In accordance with preferred embodiments, the processing device is housed within an anti-tampering enclosure and is configured to encrypt sensitive information transmitted by the device. The system and method therefore prevents interception and/or decoding of sensitive information provided via the touch screen in one or more of the manners described above. As a result, the touch screen does not require a tamper-proof housing, nor does it require encryption of data transmitted by the touch screen. Nonetheless, it should be understood that data transmitted by and to the touch screen may be encrypted if desired.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope of the appended claims and their equivalents.

What is claimed is:

1. A fuel dispenser having a user interface configured to facilitate transactions, the dispenser comprising:
   a touch screen having a screen area, wherein the touch screen comprises a plurality of detection locations; and
   electronics in electrical communication with the touch screen, the electronics operative to provide a virtual PIN pad on said touch screen having a first plurality of virtual buttons sufficient to present an entire PIN pad and, when displaying unsecure content during which receipt of PIN information is not permitted, provide a second plurality of virtual buttons less than that required to present an entire PIN pad;
   said electronics being operative when receipt of a PIN is permitted to:
      render said virtual PIN pad having said first plurality of virtual buttons, said first plurality of virtual buttons comprising at least ten of said virtual buttons; and
      determine a numerical sequence entered by a user at the virtual PIN pad;
   said electronics being operative when displaying unsecure content to:
      render said second plurality of virtual buttons, said second plurality of virtual buttons comprising no more than eight of said virtual buttons; and
      determine selections entered by a user such that a fake PIN pad cannot ascertain the user's PIN when unsecure content is being displayed.

2. The fuel dispenser of claim 1, wherein the virtual PIN pad comprises a display area less than the screen area.

3. The fuel dispenser of claim 2, wherein detection locations not corresponding to said virtual PIN pad are disabled when said virtual PIN pad is being displayed.

4. The fuel dispenser of claim 1, wherein detection locations not corresponding to said second plurality of virtual buttons are disabled when unsecure content is being displayed.

5. The fuel dispenser of claim 1, wherein each of said second plurality of virtual buttons corresponds to a group of detection mechanisms of said touch screen.

6. The fuel dispenser of claim 1, wherein said electronics are operative when said virtual PIN pad is being displayed to render said virtual PIN pad at varying pad locations on the touch screen with each successive transaction.

7. A method performed by electronics of controlling a touch screen on a fuel dispenser, said method comprising steps of:
   determining whether said fuel dispenser is available for receipt of confidential transaction information or alternatively available for display of on said touch screen;
   if said fuel dispenser is available for receipt of confidential transaction information:
      rendering a virtual PIN pad having said first plurality of virtual buttons on said touch screen, wherein said first plurality of virtual buttons comprises at least ten of said virtual buttons; and
      determining a numerical sequence entered by a user at the virtual PIN pad;
   if said fuel dispenser is available for display of unsecure content:
      rendering a second plurality of virtual buttons on said touch screen, said second plurality of virtual buttons being less than that required to present an entire PIN pad, wherein said second plurality of virtual buttons comprises no more than eight of said virtual buttons;
      displaying unsecure content on said touch screen; and
      determining selections entered by a user at the second plurality of virtual buttons but such that a fake PIN pad cannot ascertain the user's PIN when unsecure content is being displayed.

8. The method of claim 7, wherein the virtual PIN pad comprises a display area less than the screen area.

9. The method of claim 8, wherein detection locations not corresponding to said virtual PIN pad are disabled when said virtual PIN pad is being displayed.

10. The method of claim 7, wherein detection locations not corresponding to said virtual non-PIN pad are disabled when the second plurality of virtual buttons are being displayed.

11. The method of claim 7, wherein each of said second plurality of virtual buttons corresponds to a group of detection mechanisms of said touch screen.

12. The method of claim 7, wherein said electronics are operative to render said virtual PIN pad at varying pad locations on the touch screen with each successive transaction.

* * * * *